T. M. PHILLIPS.
METHOD OF UTILIZING FURNACE FLUE DUST.
APPLICATION FILED MAY 18, 1908.
919,073.
Patented Apr. 20, 1909.
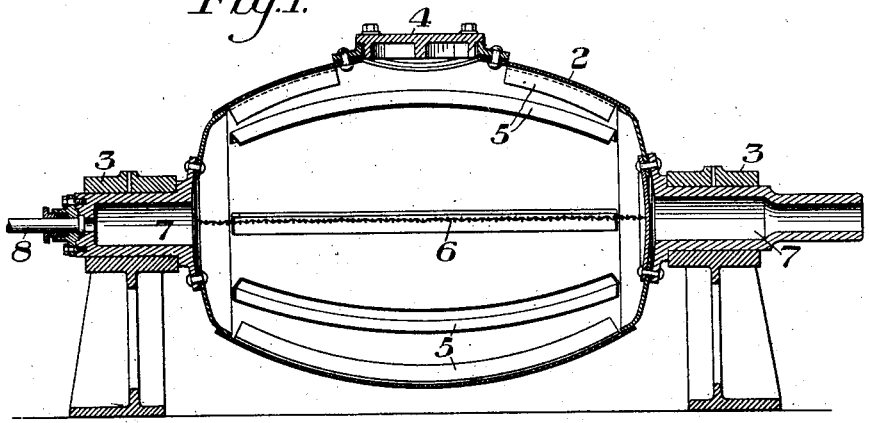
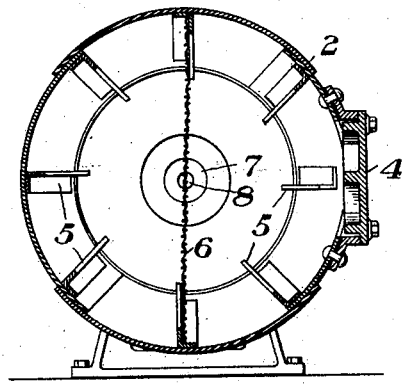
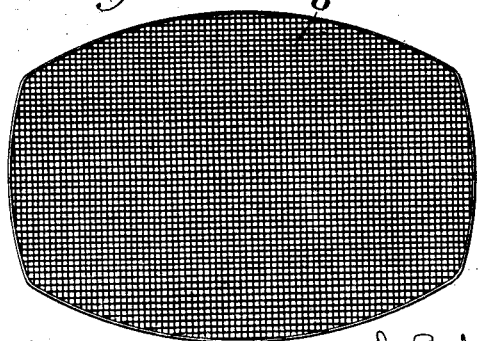
WITNESSES
INVENTOR

UNITED STATES PATENT OFFICE.

THOMAS M. PHILLIPS, OF YOUNGSTOWN, OHIO, ASSIGNOR OF ONE-THIRD TO THE YOUNGSTOWN STEEL COMPANY, OF YOUNGSTOWN, OHIO, A CORPORATION OF OHIO, AND ONE-THIRD TO EDWARD L. FORD, OF YOUNGSTOWN, OHIO.

METHOD OF UTILIZING FURNACE-FLUE DUST.

No. 919,073.   Specification of Letters Patent.   Patented April 20, 1909.

Application filed May 18, 1908. Serial No. 433,437.

*To all whom it may concern:*

Be it known that I, THOMAS M. PHILLIPS, of Youngstown, Mahoning county, Ohio, have invented a new and useful Method of Utilizing Furnace-Flue Dust, of which the following is a full, clear, and exact description, reference being had to the accompanying drawings, forming part of this specification, in which—

Figure 1 is a longitudinal section of one form of apparatus which I may employ; Fig. 2 is a transverse section of the same with the drum rotated through an angle of approximately ninety degrees, and Fig. 3 is a plan view of the interior screen removed.

My invention has relation to the utilization of blast furnace flue dust, and is designed to provide a novel method by means of which such dust may be returned to the furnace for use.

In accordance with my invention, I take clay, and by a suitable treatment with water, form it into a fluid paste or cream, with which the flue dust is afterward mixed. I preferably prepare this cream or liquid paste or clay in the following manner:—The clay is placed in the horizontal drum or cylinder shown at 2 in the accompanying drawing, and which is mounted for rotation in suitable bearings 3. This cylinder is provided at one side with a filling opening having a removable close-fitting cover 4. It is also provided with interior longitudinally extending agitators 5 and with a longitudinally extending screen 6, preferably of wire mesh, and which divides the interior of the cylinder into two compartments, into one of which the opening before referred to leads. One or both of the trunnions 7 of the cylinder or drum are made hollow for the admission of steam from a suitable supply pipe 8. In the drawings I have shown the steam as admitted through one only of the trunnions. The cylinder may be rotated by any suitable means (not shown). In operation, the clay is placed in this cylinder with sufficient water to start the operation, and the door is then closed and steam is turned in through the hollow trunnion. The cylinder is steam-tight, and as the lumps of clay revolve in the cylinder they are part of the time up in the steam space thereof and part of the time are under the water which collects at the lower portion of the cylinder largely from the condensed steam. The internal plates or agitators tend to lift the clay and keep it in motion, so that in a very few minutes the clay has become reduced to the consistency of cream. The steam is then shut off, the door is opened, and the contents are dumped preferably into an ordinary concrete mixer, in which has been placed the right amount of flue dust. A few revolutions of this mixer completes the operation, and the mixture is then ready to be used in the furnace.

The provision of the horizontal screen within the drum or cylinder not only largely assists in reducing the clay to the proper consistency, as the water will carry portions of the clay through the screen, but it also prevents the discharge of any lumps or large particles of clay into the mixer where the final mixture with the flue dust is made.

The method described is an economical one, requiring but little labor, and inasmuch as the particles of clay are almost infinitely small, a very much smaller amount of clay will give the desired plasticity. I have also found that the final mixture of the clay, cream, and flue dust works well in the blast furnace. I preferably add flue dust to the clay cream in about the following proportions:—four of flue dust to one of clay; the final mixture being in a still more or less fluid condition, which will hold the particles of dust together until after they are fed into the furnace. I do not, however, limit myself to any exact proportion of the flue dust, as it may be mixed with the clay cream in various proportions.

What I claim is:—

1. The method of utilizing blast furnace flue dust, which consists in mixing the same with clay reduced to the consistency of a cream or liquid paste, and feeding the same to the furnace in a liquid condition; substantially as described.

2. The method of utilizing blast furnace flue dust, which consists in mixing clay with water to form a cream or liquid paste, then adding the flue dust to such cream or paste and feeding the same to the furnace in a liquid condition; substantially as described.

3. The method of utilizing blast furnace flue dust, which consists in mixing clay with water to form a cream or liquid paste, then adding the flue dust to such cream or paste, and charging the mixture into a furnace in a fluid or sloppy condition; substantially as described.

4. The method of utilizing blast furnace flue dust, which consists in forming a liquid paste or cream from clay mixed with water and steam, and then adding the flue dust thereto; substantially as described.

5. In the utilization of blast furnace flue dust, the method of preparing a vehicle for the flue dust, which consists in mixing clay with steam and water to form a liquid paste or cream; substantially as described.

6. In the utilization of blast furnace flue dust, the method of preparing a vehicle for the flue dust, which consists in subjecting the clay with agitation to steam and water, and forming a liquid paste or cream therefrom; substantially as described.

In testimony whereof, I have hereunto set my hand.

T. M. PHILLIPS.

Witnesses:
N. B. FOLSOM,
GEORGE R. PERKINS.